United States Patent [19]
Conti et al.

[11] Patent Number: 4,837,385
[45] Date of Patent: Jun. 6, 1989

[54] PROCESS FOR SEPARATING THE INCLUSIONS CONTAINED IN A BATH OF MOLTEN METAL, BY FILTRATION

[75] Inventors: Calogero Conti, Bois D'Hayne, Belgium; Jean-Luc Meyer, Voiron, France; Pierre Netter, Pont St. Esprit, France; Jean-Pierre Riquet, St. Hilaire de la Cote, France

[73] Assignee: Aluminium Pechiney, Paris, France

[21] Appl. No.: 182,502

[22] Filed: Apr. 18, 1988

[30] Foreign Application Priority Data

May 7, 1987 [FR] France ................ 87 06879

[51] Int. Cl.⁴ .............. C22B 15/00; C02F 1/48
[52] U.S. Cl. .................. 210/695; 210/773; 75/93 R
[58] Field of Search .......... 210/695, 773, 222, 223; 75/10.67, 93 R, 93 E, 93 AC; 266/227, 237

[56] References Cited

U.S. PATENT DOCUMENTS

| | | |
|---|---|---|
| 3,929,433 | 12/1975 | Lucero ................ 210/222 X |
| 4,014,529 | 3/1977 | Puzhailo et al. ........ 266/237 X |
| 4,191,558 | 3/1980 | Gould ................ 210/773 X |
| 4,238,326 | 12/1980 | Wolf .................... 210/695 |
| 4,436,627 | 3/1984 | McMonigle ............ 210/695 |
| 4,537,627 | 8/1985 | Tyler et al. ............ 75/93 R |

FOREIGN PATENT DOCUMENTS 56717 7/1982 European Pat. Off. ........... 210/695

*Primary Examiner*—Tom Wyse
*Attorney, Agent, or Firm*—Dennison, Meserole, Pollack & Scheiner

[57] ABSTRACT

The invention relates to a process for separating the inclusions contained in a bath of molten metal, by filtration. This process involves applying an electromagnetic force field to the filtering medium. It allows the total number and the size of the inclusions to be reduced greatly so that the products obtained by solidification of such a bath are highly suitable for transformation.

24 Claims, 2 Drawing Sheets

PROCESS FOR SEPARATING THE INCLUSIONS CONTAINED IN A BATH OF MOLTEN METAL, BY FILTRATION

The invention relates to a process for separating the inclusions contained in a bath of molten metal, by filtration.

A person skilled in the art of founding knows that pure metals or alloys are polluted to a greater or lesser extent during production thereof by solid inclusions originating:

from the charges introduced into the melting furnaces from the products of the reaction between the molten metal bath and the surrounding atmosphere from the abrasion or local dislocation of the refractory linings of the furnaces from the salts and fluxes used for purifying or refining the metal.

These inclusions assume the form of isolated particles or of macroscopic aggregates having dimensions varying from a few microns to several millimetres. If these inclusions are left in the molten metal bath, they can cause porosity or even slots during the solidification of the metal and can consequently lead to the formation of air holes or detachments during the heat treatment of the cast products and to the formation of holes or breakages during the transformation into semi-finished products.

It has therefore been found to be essential to remove these inclusions from the molten metal bath before proceeding to the following shaping stages.

Numerous processes have been recommended for achieving this separation. They are based on various methods which are adapted to a greater or lesser extent to the dimensions of the inclusions. They include, in particular, static decantation dynamic decantation using liquid distributors intended to reduce the speed of circulation of the metal stream flotation using curtains of gas bubbles through which the metal passes in order to abandon its inclusions "deep" filtration in which the molten metal passes through a filtering medium, that is to say a medium having interconnected spaces which, although they have a greater cross-sectional area than the inclusions, still retain said inclusions by trapping them on the walls defining them. U.S. Pat. No. 2,863,558 describes such a filtration process.

The difference in density between the molten metal and the inclusions plays a significant part in these processes. Now, the inclusions sometimes have a density similar to that of the metal. This is the case, for example, with $MgCl_2$ and molten aluminium.

It is thus necessary for suitably effective separation to operate either statically for long periods or dynamically at very low metal flow rates. This involves over-sized installations if industrial filtration capacities are desired.

This is why other methods have been tested, such as socalled "cake" filtration in which the filter is provided with holes having dimensions smaller than those of the inclusions. Of course, in this case, the effectiveness of filtration is very good whatever the speed of filtration but these filters cause very significant losses of charge which are incompatible with the traditional casting installations.

Furthermore, it is known that solid particles in suspension in liquids can be separated by applying to them, in the absence of any filtering medium, electromagnetic forces which have the effect of draining the inclusions. However, these processes have not been employed industrially because the forces required were very high and necessitated large and very expensive electrical installations.

Confronted with these problems and with the object of improving separation by filtration both with respect to the quantity per unit of surface area and per unit time and with respect to the dimensions of the inclusions, the applicant has developed a process based on deep filtration, the only method which is widely used at present in industry.

This process is characterized in that a field of electromagnetic forces is applied to the filtering medium through which the molten metal bath passes.

As seen above, the filtering media have the effect of trapping the inclusions on the walls defining the spaces. This gave rise to the applicant's idea of trying to drain the inclusions more effectively towards the walls. He succeeded by applying an electromagnetic force field to the filtering medium. In fact, he has found that, as the inclusions virtually always have a much higher electrical resistance than the molten metal, the field had an effect on the metal only and therefore, by reaction, the inclusion was led away in a direction opposed to the direction of the field. By acting on this different behaviour of the metal and the inclusions, the inclusions could be intercepted by the walls. Moreover, in media which act as filters in the absence of an electromagnetic force field, trapping can be unstable on certain walls, in particular if the quantity of inclusions exceeds a certain level. In the case of the present invention, it has been found that, under the influence of the electromagnetic force field, the inclusions flattened themselves against the wall of the medium where they were much more resistant to the phenomenon of salting out.

The electromagnetic forces applied to the filtering medium and acting on the metal are directed in their entirety either in a direction perpendicular to the direction of filtration or in a parallel direction. The term direction of filtration means the average direction in which the metal mainly flows in the filtering medium. These forces have a value higher than $1.10^3$ N/m3 because, below this value, the effectiveness of the field becomes too low. This value is preferably between $1.10^3$ and $1.10^6$ N/m3.

The filtering medium corresponds, in the invention, to any medium constituted by a porous mass, the pores of which have a greater crosssectional area than the inclusions and through which the molten metal bath passes at a speed of between 0.1 and 1.5 cm/sec. It is formed, for example, by a single block or by several superimposed blocks of ceramic foam.

by a bed of loose materials having local gaps between them, the dimensions of which are greater than the dimensions of the inclusions and through which the molten metal bath passes at a speed of between 0.01 and 0.7 cm/sec. These include, for example, beads or tablets of alumina, silica and carbon.

by at least one filtering candle, the porosity of which allows the molten metal bath to pass at a speed of between 0.01 and 0.06 cm/sec.

In certain cases there is used a filtering medium constituted either by a porous mass or by a bed composed or loose materials but having an impermeable region in its centre and over the entire thickness traversed by the metal.

These media are or are not chemically inert towards the molten metal. They may or may not be coated with products such as fluxes, for example. They are preferably used in filtering ladles in the presence or absence of gas streams having either a chemical action or merely a physical effect on the metal.

The field of electromagnetic forces is directed in two main directions: either a direction perpendicular to the direction of filtration in the case of a porous mass or of a bed, or in a direction parallel to the direction of filtration in the case of a porous mass, a bed or a candle.

Depending on the first direction, these forces are created
either by the passage of a direct current in the metal through the entire thickness of the filtering medium in the direction of filtration. This current which circulates either in the direction of filtration or in the opposite direction creates its own magnetic field and consequently generates a force field directed towards the centre of the filtering medium;
or by the association of the same direct current with a continuous magnetic field having a direction perpendicular to the direction of filtration, generating a force field directed perpendicularly both to the magnetic field and to the direction of filtration in one or other direction, depending on the direction of the current and of the field.

The direct current enters the molten metal bath via at least one pair of electrodes supplied by a generator and placed on the bath upstream and downstream of the filtering medium. The continuous magnetic field is obtained by means of at least one electromagnet or at least two permanent magnets forming a northsouth unit, which are all placed opposite opposing lateral faces of the filtering medium.

In the particular case where the filtering medium has an impermeable region, the force field is created:
either by the passage of a direct current in the direction of filtration, the current being obtained, as before, by means of a generator and at least two electrodes; the impermeable region acts as an electrode through which there passes a proportion of the direct current so as to avoid the "hole" of force in the centre of the filtering medium;
or by surrounding the filtering medium with at least one turn of a solenoid traversed by a current at a frequency below or equal to 60 Hz.

In these two cases, the force field is radial and is directed towards the centre of the filtering medium, that is to say perpendicularly to the direction of filtration.

In a direction parallel to the direction of filtration, the field of forces is created by associating a continuous magnetic field having a direction perpendicular to the direction of filtration with a direct current passing in the metal in a direction perpendicular to the magnetic field and to the direction of filtration.

Depending on the direction of the current or of the magnetic field, the field of forces is directed in the direction of filtration or in the opposite direction. In this case, the magnetic field is obtained by means of an electromagnet or of at least one pair of permanent magnets forming a north-south set all arranged opposite opposing lateral faces of the filtering medium. The filtering medium is thus preferably equipped on its faces traversed by the bath with electrically insulating partitions which are parallel to the direction of filtration and perpendicular to the direction of the current so as to prevent the bath placed outside the filtering medium from shortcircuiting the direct current and cancelling the field of forces in said medium.

If the filtering medium is a filtering candle, the field of forces is obtained by means of a solenoid traversed by a current having a frequency below or equal to 60 Hz placed inside or outside said candle, the turns of which occupy at least a fraction of its height.

The invention can be illustrated by means of the drawings attached to the present application.

Figure 1:
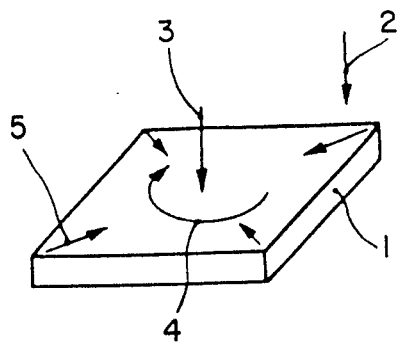
FIG. 1 shows a filtering medium to which there is applied an electromagnetic force field perpendicular to the direction of filtration created by a direct current.

More specifically, FIG. 1 shows a filtering medium 1 occupying the entire cross-section of a filtering ladle (not shown) through which a bath of molten metal passes in the direction 2 and to which there is applied a direct current of direction 3 which generates its own magnetic field 4 and creates an electromagnetic force field of direction 5.

Figure 2:
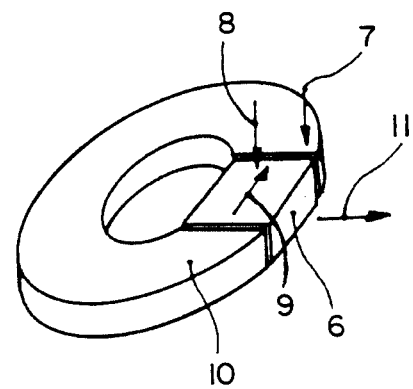
FIG. 2 shows a filtering medium to which there is applied an electromagnetic force field perpendicular to the direction of filtration created by association of a continuous magnetic field and a direct current.

FIG. 2 shows a porous medium 6 arranged as before and traversed by the bath in the direction 7 and to which there is applied a direct current of direction 8 associated with a continuous magnetic field of direction 9 obtained by means of the electromagnet 10, this association creating an electromagnetic force field of direction 11.

Figure 3:
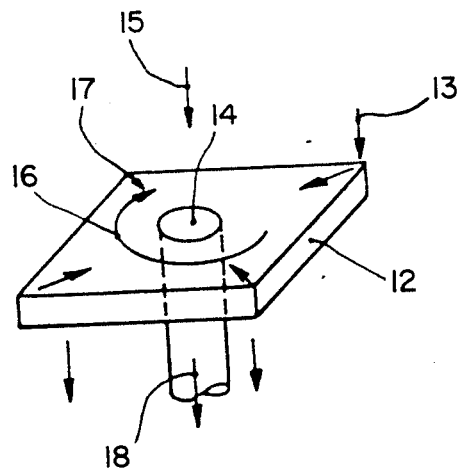
FIG. 3 shows a filtering medium having an impermeable region to which there is applied an electromagnetic force field perpendicular to the direction of filtration created by a direct current.

FIG. 3 shows a porous medium 12 arranged as before, traversed by the bath in direction 13 and having an impermeable region 14 to which there is applied a direct current of direction 15 which generates its own magnetic field of direction 16 and creates an electromagnetic force field of direction 17. A proportion 18 of the direct current which passes through the medium passes through the region 14.

Figure 4:
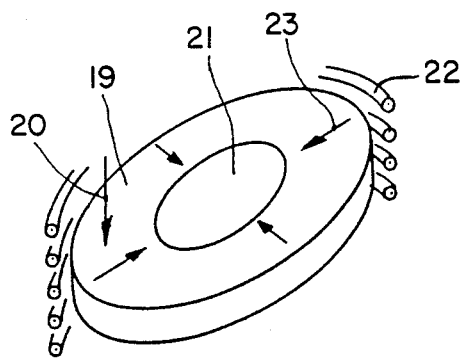
FIG. 4 shows a filtering medium having an impermeable region to which there is applied an electromagnetic force field perpendicular to the direction of filtration created by a solenoid traversed by an alternating current.

FIG. 4 shows a filtering medium 19 arranged as before, traversed by the bath in the direction 20 and having an impermeable region 21, said medium being surrounded by several turns of a solenoid 22 which creates an electromagnetic force field 23.

Figure 5:
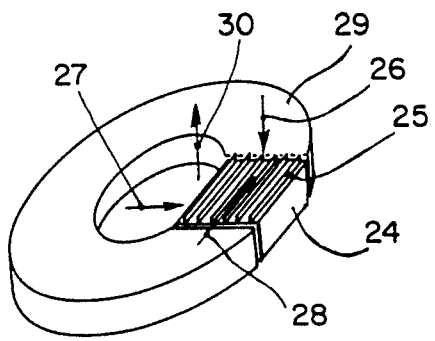
FIG. 5 shows a filtering medium to which there is applied an electromagnetic force field parallel to the direction of filtration created by the association of a continuous magnetic field and a direct current.

FIG. 5 shows a filtering medium 24 arranged as before and equipped with partitions 25 traversed by the bath in the direction 26 and to which there is applied a direct current of direction 27 associated with a continuous magnetic field of direction 28 generated by an electromagnet 29, this association creating an electromagnetic force field of direction 30.

Figure 6:
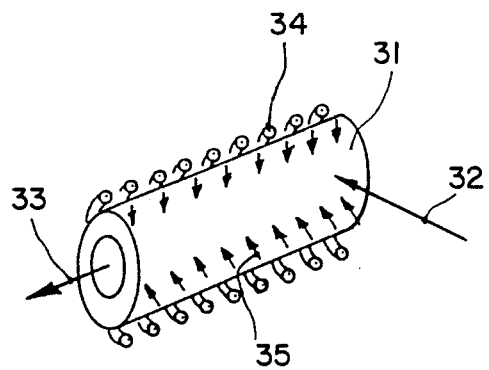
FIG. 6 shows a filtering candle to which there is applied an electromagnetic force field parallel to the direction of filtration created by a solenoid traversed by an alternating current and which surrounds the candle.

FIG. 6 shows a filtering candle 31 arranged in a bath which circulates in the direction 32 and leaves in the direction 33, said candle being surrounded by a solenoid 34 which creates an electromagnetic force field of direction 35.

The invention will be understood better by means of the following embodiment:

An aluminium alloy of the type 1050 according to the Aluminium Association standards was melted then divided into four fractions labelled 1, 2, 3 and 4. Each of the fractions was cast in the form of billets after having been subjected to a treatment in a ladle for separating the inclusions, except for fraction 1 which serves as a control sample and which was cast directly.

Fraction 2 was subjected to an electromagnetic drainage treatment, that is to say that a field of forces of $1.5 \cdot 10^4$ N/m3 was applied to it in the absence of filtering media.

Fraction 3 was passed at a speed of 0.7 cm/sec through a bed having a thickness of 5 cm constituted by a material having an open porosity of 65% and an average pore size of 1.5 mm.

Fraction 4 was treated as fraction 3 but by applying to the bed according to the invention a field of forces of $1.5 \cdot 10^4$ N/m3 directed perpendicularly to the direction of filtration.

Some samples taken from each of the fractions were dissolved in brominated methanol in order to measure the levels of inclusions corresponding to each method of separation. Two types of measurement were taken:

one involves determining the diameter of the greatest inclusion remaining in the dissolution residue;

the other involves the overall harmfulness of all the inclusions or the inclusion harmfulness I. To obtain this, each inclusion is assigned a degree of harmfulness (i) connected to its diameter $\phi$ in the manner indicated in the following table:

| Size of the Inclusion $\phi$ (μm) | Degree of harmfulness (i) |
|---|---|
| $0 < \phi < 20$ | 1 |
| $20 < \phi < 40$ | 2 |
| $40 < \phi < 60$ | 4 |
| $60 < \phi < 80$ | 10 |
| $100 < \phi$ | 20 |

The inclusion harmfulness I corresponds to the formula:

$$I = \Sigma d(\phi) \times i(\phi)$$

wherein d ($\phi$) is equal to the number of inclusions of diameter $\phi$ per unit volume of metal and i ($\phi$) is the degree of harmfulness described above.

The results obtained from the four samples are as follows:

| Sample No. | Diameter of the largest inclusion (μm) | Inclusion harmfulness I |
|---|---|---|
| 1 | 150 | 3000 |
| 2 | 200 | 2500 |
| 3 | 80 | 200 |

-continued

| Sample No. | Diameter of the largest inclusion (μm) | Inclusion harmfulness I |
|---|---|---|
| 4 | 10 | 15 |

It is therefore found in sample 4, resulting from a metal treated according to the invention, that, on the one hand, it does not contain inclusions having a diameter greater than 10 μm whereas this diameter is 200 μm for electromagnetic drainage alone and 80 μm for the trapping in a filtering medium alone and, on the other hand, it has an inclusion harmfulness of 15 whereas it is 2500 in the case of the drainage process and 200 in the case of trapping.

These results show that the process according to the invention allows a very low level of inclusions in a metal bath to be achieved. Hence, the metallurgical products obtained by solidification of such a bath are far more suitable for transformation than those of the prior art.

We claim:

1. A process for separating inclusions contained in a molten metal bath comprising passing a molten metal bath containing inclusions having a higher electrical resistance than the molten metal through a filtering medium, and applying an electromagnetic force field of a strength at least $1 \times 10^3$ N/m$^3$ to said medium, causing said filtering medium to more effectively retain said inclusions.

2. A process according to claim 1, wherein the forces of said field have a value of between $1.10^3$ and $1.10^6$ N/m3.

3. A process according to claim 1, wherein the filtering medium is a porous mass through which the bath passes at a speed of between 0.1 and 1.5 cm/sec.

4. A process according to claim 1, wherein the filtering medium is a thick bed of loose materials through which the bath passes a speed of between 0.01 and 0.7 cm/sec.

5. A process according to claim 1, wherein the filtering medium is at least one filtering candle through which the bath passes at a speed of between 0.01 and 0.06 cm/sec.

6. A process according to claim 3 or 4, wherein the filtering medium has an impermeable region in its center and over the entire thickness traversed by the metal.

7. A process according to claim 6, wherein the force field is created by passing a direct current in the direction of filtration.

8. A process according to claim 6, wherein the impermeable region forms an electrode through which a portion of the current passes.

9. A process according to claim 6, wherein the filtering medium is surrounded by at least one turn of a solenoid traversed by a current having a frequency below or equal to 60 Hz.

10. A process according to claim 3 or 4, wherein the forces of said field are directed mainly in a direction perpendicular to the direction of filtration.

11. A process according to claim 10, wherein the force field is created by passing a direct current in the metal through the entire thickness of the filtering medium and in the direction of filtration.

12. A process according to claim 11, wherein the direct current passes into the bath of molten metal via at least one pair of electrodes supplied by a generator and placed in the bath upstream and downstream of the filtering medium.

13. A process according to claim 10, wherein the force field is created by associating a continuous magnetic field having a direction perpendicular to the direction of filtration with a direct current passing in the metal in the direction of filtration.

14. A process according to claim 13, wherein the continuous magnetic field is obtained by means of at least one electromagnetic placed opposite opposing lateral faces of the filtering medium.

15. A process according to claim 13, wherein the continuous magnetic field is obtained by means of at least two permanent magnets forming a north-south unit placed opposite the opposing lateral faces of the filtering medium.

16. A process according to claim 3, 4, or 5, wherein the forces are directed mainly in a direction parallel to the direction of filtration.

17. A process according to claim 16, wherein the force field is created by associating a continuous magnetic field having a direction perpendicular to the direction of filtration with a direct current passing in the metal in a direction perpendicular to the magnetic field and to the direction of filtration.

18. A process according to claim 17, wherein the magnetic field is created by an electromagnet acting on the opposing lateral faces of the filtering medium.

19. A process according to claim 17, wherein the magnetic field is created by at least one pair of permanent magnets forming a north-south assembly placed opposite the lateral faces opposing the filtering medium.

20. A process according to claim 17, wherein said filtering medium is equipped on its faces traversed by the bath with electrically insulating partitions which are parallel to the direction of filtration and perpendicular to the direction of the current.

21. A process according to claim 5, wherein each candle is surrounded by a solenoid traversed by a current having a frequency below or equal to 60 Hz, the turns of which occupy at least a fraction of the height of said candle.

22. A process according to claim 5, wherein, inside each candle, there is placed a solenoid traversed by a current having a frequency below or equal to 650 Hz, the turns of which occupy at least a fraction of the height of said candle.

23. A process according to claim 10, wherein the direct current passes into the bath of molten metal via at least one pair of electrodes supplied by a generator and placed in the bath upstream and downstream of the filtering medium.

24. A process according to claim 1, wherein the filtering medium is formed by a material selected from the group consisting of ceramic foam, alumina, silica and carbon.

* * * * *